United States Patent [19]

Imsand

[11] 4,006,291
[45] Feb. 1, 1977

[54] THREE DIMENSIONAL TELEVISION SYSTEM

[76] Inventor: Donald J. Imsand, 12 Walnut Ave., Shalimar, Fla. 32579

[22] Filed: Feb. 22, 1974

[21] Appl. No.: 445,002

[52] U.S. Cl. .......................... 358/92; 178/DIG. 45
[51] Int. Cl.² .......................................... H04N 9/56
[58] Field of Search ...... 178/6.5, DIG. 24, DIG. 45

[56] References Cited
UNITED STATES PATENTS

| | | | |
|---|---|---|---|
| 3,060,795 | 10/1962 | Corrigan | 178/DIG. 45 |
| 3,278,676 | 10/1966 | Becker | 178/DIG. 45 |
| 3,457,364 | 7/1969 | Carrillo | 178/6.5 |
| 3,674,921 | 7/1972 | Goldsmith | 178/6.5 |

*Primary Examiner*—Howard W. Britton
*Attorney, Agent, or Firm*—Joseph E. Rusz; Arsen Tashijian

[57] ABSTRACT

Method and apparatus for producing a three dimensional television image by presenting stereoptican pairs of images to the viewers eyes. One of the stereoptican partners is presented most of the time while the second stereoptican partner is flashed on and off rapidly. Under the proper conditions with the second stereoptican partner being flashed on for a suitably short period of time at the proper repetition rate, the viewer is not consciously aware of its presence and effectively perceives the picture as a three dimensional image.

6 Claims, 2 Drawing Figures

THREE DIMENSIONAL TELEVISION SYSTEM

BACKGROUND OF THE INVENTION

This invention relates to a method and apparatus for producing a three dimensional television image and, more particularly, the invention is concerned with providing a single three dimensional image by presenting a pair of stereo images, one of the pair being exposed for a relatively long period of time while the other being flashed at the subliminal level.

The production of a system that would be compatible with present broadcast standards and would produce the desired three dimensional effect without the use of special viewing glasses and without undesired effects on the viewer has long been a goal of the television industry. One such system is described in my previously filed U.S. Pat. application Ser. No. 308,209 now abandoned.

Human visual perception of three dimensions requires, in part, stereo images, one image corresponding to each eye, viewed from slightly different angles corresponding to the separation of the eyes. A three dimensional television system requires a stereo pair of television cameras and a means for combining the camera electronic signals into a single electronic signal suitable for broadcast. The method of the aforementioned application Ser. No. 308,209, now abandoned, is such a system but the system has some inherent undesired effects such as jumping effect in the foreground when stereo cameras are aimed at background or jumping effect in the background when cameras are aimed at foreground.

Subliminal techniques have already been introduced to television. A picture that suggested to viewers that they drink a name brand soft drink was flashed to viewers. The suggestive picture was flashed on and off so rapidly that viewers were not consciously aware that the picture had been flashed on. However, it was found that the picture had a subconscious or subliminal effect on the viewers and many of the viewers went to their refrigerators and got soft drinks as the picture suggested.

SUMMARY OF THE INVENTION

The present invention uses the three dimensional television technique previously discussed in a unique combination with subliminal techniques in order to achieve the perception of three dimensions by the viewers without the aforementioned undesired effects.

The invention relates to three dimensional television image production, and more particularly to a method and apparatus for solving the problems of three dimensional television image production in an extremely simple manner.

An object of the present invention is to provide a method and apparatus which presents a stereoptican pair of images, one partner at a time but alternating the two images, but with each partner exposed to both eyes simultaneously.

The three dimensional illusion is produced by presenting stereoptican pairs of images to the viewers eyes. However, one of the stereoptican partners is presented most of the time. The second stereoptican partner image if flashed on and off rapidly such that the viewer may not be consciously aware that the second partner has been flashed on. The purpose of flashing the second partner on and off very rapidly is to prevent the viewer from being consciously aware of the second partner, but when the second stereoptican partner is flashed on for a correct period of time and at a correct repetition rate, the viewer will subconsciously observe the second partner and the picture will be perceived by the viewer as a three dimensional image.

A further object of the invention is the production of a method and a device for three dimensional image production which is adaptable to television broadcasting and closed circuit television.

A still further object of the invention is the simplification of a method of projecting stereo images which has a wider application than any devised method, one of these being television projection and home viewing without replacement or modification of home television sets now installed.

These and other advantages, features and objects of the invention will become more apparent from the following description taken in connection with the illustrative embodiment in the accompanying drawings.

DESCRIPTION OF A PREFERRED EMBODIMENT

Figure 1:
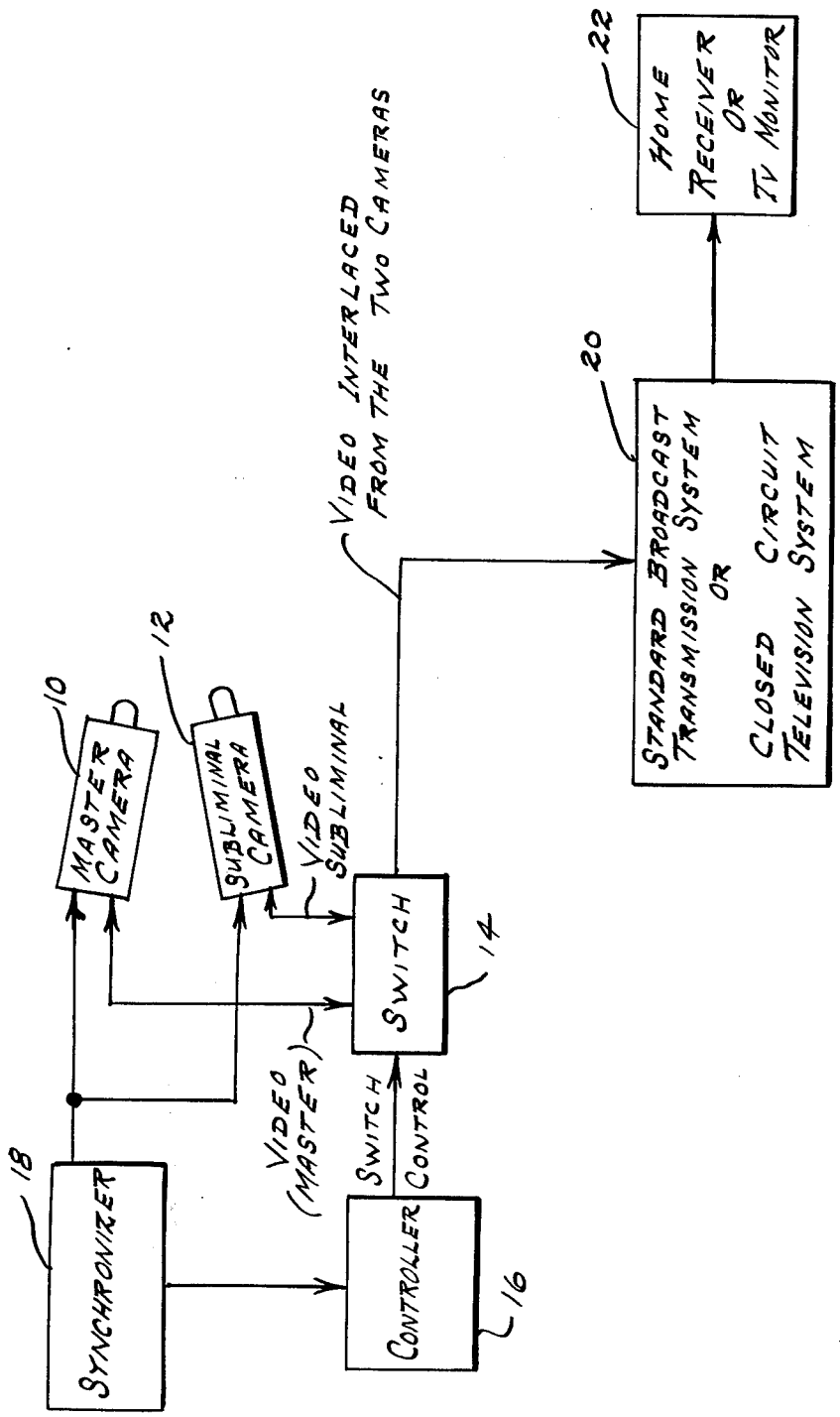
FIG. 1 is a diagrammatic view showing the devices required for the display of three dimensional images in the manner provided by the television video apparatus according to the invention.

Referring now in detail to the drawing:

Two television cameras 10 and 12 with identical lenses, are correctly spaced and aimed for taking pictures which have a stereo relation to each other. The diagram includes a video switch 14 which allows video from one camera and then the other camera to pass, a controller 16 for controlling the switch, and a television synchronization generator 18 for synchronizing the switch controller and synchronizing the video of the two cameras. The transmission medium 20 and receiver or monitor 22 are included to complete the illustration.

Figure 2:
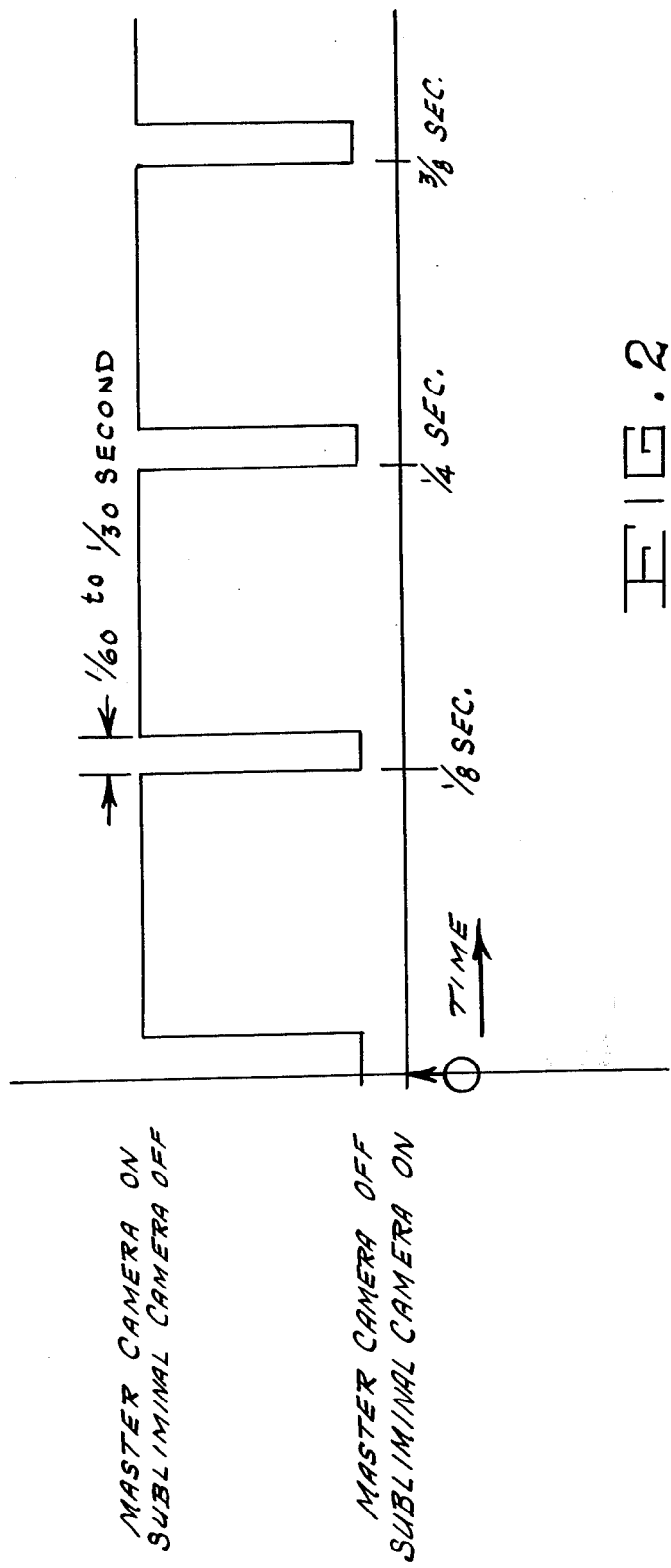
FIG. 2 is a timing diagram to illustrate when the video signal from each camera is allowed to pass through the video switch of FIG. 1.

The two cameras 10 and 12 are aimed and focussed on the desired object and the video from the two cameras are synchronized together by the synchronization generator 18. The video from the two cameras are applied to the video switch 14. The controller 16 may receive synchronization signals from the synchronization generator 18. The controller 16 controls the switch 14 to allow the video first from one camera to pass then from the other camera to pass. An example of the amount of time that the video from each camera is allowed to pass is illustrated in FIG. 2. It should be noted that the video from the master camera 10 is allowed to pass for a much longer period of time than the video from the subliminal camera 12. This is essential to the present invention since it is desired that the viewer be consciously aware only of the video from the camera that is switched on the longer period of time (which is referred to as the master camera). The other camera, which is referred to as the subliminal camera, provides the subliminal three dimensional effect and is turned on for short periods of time, say 1/60 to 1/30 of a second, at a rate of approximately 8 times per second.

Although the invention has been described with reference to a particular embodiment, it will be understood to those skilled in the art that the invention is capable of a variety of alternative embodiments within the spirit of the appended claims. For example, the master camera could be either one of the cameras or the timing of the switching could be changed and still result in the desired effect. Also this same technique could be applied to three dimensional motion picture production.

I claim:

1. A method of displaying by projecting a stereo pair of images to present a single three dimensional image to normal human perception comprising the steps of positioning a pair of video cameras in stereo relation to each other to view a scene, switching the video signal from first one camera and then the other camera, controlling the time interval that each of the cameras is operative so that one camera is active nearly all of the time while the other camera is active only briefly, synchronizing the video of the two cameras and switched video signals, and transmitting and displaying the switched video signals on a conventional television receiver thereby allowing the human visual perception process to interpret the switched signals as a single three dimensional image.

2. The method of presenting a three dimensional television image defined in claim 1 wherein the step of controlling the time interval of operation of one of the cameras is nearly continuous while the time interval of operation of the other camera is at the subliminal level.

3. The method of presenting a three dimensional television image defined in claim 2 wherein one camera is operative for 13/120 of a second and the other camera is operative for 2/120 of a second during each ⅛ second of operation.

4. The method of presenting a three dimensional television image defined in claim 2 wherein one camera is operative for 11/120 of a second and the other camera is operative for 4/120 of a second during each ⅛ second of operation.

5. Apparatus for producing a television video signal which appears as a three dimensional image to human visual perception when displayed on a suitable conventional television receiver, said apparatus comprising a pair of television cameras positioned in stereo relation to each other, an electronic video switch operatively connected to said cameras for passing first the video from one camera and then the video from the other camera, a controller operatively connected to said electronic video switch for controlling said video switch to allow the video from one camera to pass nearly all of the time but to interrupt the video from the other camera to pass for a brief instant several times each second, a synchronization generator operatively connected to said cameras and said controller for synchronizing said controller and the video of the two cameras and means for transmitting and displaying the video signals on a suitable television receiver.

6. The apparatus for producing a three dimensional television image defined in claim 5 wherein said controller operatively connected to said electronic video switch allows the video from the other camera to pass for a time interval at the subliminal level of the viewer.

* * * * *